US011038678B2

(12) United States Patent
Asanghanwa et al.

(10) Patent No.: US 11,038,678 B2
(45) Date of Patent: Jun. 15, 2021

(54) TRUSTED KEY DIVERSITY ON CLOUD EDGE DEVICES

(71) Applicant: Microsoft Technology Licensing, LLC, Redmond, WA (US)

(72) Inventors: Eustace Ngwa Asanghanwa, Kirkland, WA (US); Angelo Roncalli Ribeiro, Kirkland, WA (US); Mahesh Sham Rohera, Sammamish, WA (US); Michael Richard Yagley, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 16/186,481

(22) Filed: Nov. 9, 2018

(65) Prior Publication Data
US 2020/0153623 A1 May 14, 2020

(51) Int. Cl.
*H04L 9/06* (2006.01)
*H04L 9/08* (2006.01)
(Continued)

(52) U.S. Cl.
CPC .......... *H04L 9/0866* (2013.01); *G06F 21/602* (2013.01); *H04L 9/0643* (2013.01); *H04L 9/0897* (2013.01); *H04L 9/14* (2013.01); *H04L 9/3263* (2013.01); *H04L 67/10* (2013.01); *H04L 63/166* (2013.01)

(58) Field of Classification Search
CPC ....... H04L 9/0866; H04L 9/0897; H04L 9/14; H04L 9/0643; H04L 67/10; H04L 9/3263; H04L 63/166; H04L 9/3213; H04L 9/3247; G06F 21/602; G06F 2221/2129; G06F 21/44
See application file for complete search history.

(56) References Cited

U.S. PATENT DOCUMENTS 8,953,790 B2 2/2015 Qi et al.
9,703,965 B1 7/2017 Robinson et al.
(Continued)

OTHER PUBLICATIONS

"Creating an Oracle Internet of Things Cloud Service Instance", Retrieved From: https://web.archive.org/web/20170903003030/https:/docs.oracle.com/en/cloud/paas/iot-cloud/iotsu/creating-oracle-internet-things-cloud-service-instance.html, Sep. 3, 2017, 3 Pages.
(Continued)

*Primary Examiner* — Michael R Vaughan
(74) *Attorney, Agent, or Firm* — Holzer Patel Drennan

(57) ABSTRACT

A root of trust is established between a cloud and an edge device that communicates with the cloud. The root of trust may be embodied as a secret device key securely stored by the edge device and the cloud. The edge device receives arbitrary cloud modules (workloads) that include guest/tenant code that may communicate with the cloud and possibly local/leaf devices connected to or included with the edge device. The edge device extends or diversifies the root of trust to the cloud modules based on the device key. New keys are derived from the device key. The new keys are used to sign credentials (e.g. tokens or certificates) for the respective cloud modules. This provides each cloud module with its own trusted unique cloud identity that can be verified by the cloud using the cloud's copy of the device key.

15 Claims, 9 Drawing Sheets

(51) Int. Cl.
*G06F 21/60* (2013.01)
*H04L 9/14* (2006.01)
*H04L 29/08* (2006.01)
*H04L 9/32* (2006.01)
*H04L 29/06* (2006.01)

(56) References Cited

U.S. PATENT DOCUMENTS

| | | | |
|---|---|---|---|
| 9,762,392 B2 | 9/2017 | Carrer et al. | |
| 10,666,443 B2* | 5/2020 | Vyas | G06F 8/71 |
| 2017/0293769 A1* | 10/2017 | Quinlan | G06F 3/0622 |
| 2018/0309747 A1* | 10/2018 | Sweet | H04L 63/20 |
| 2020/0293698 A1* | 9/2020 | Sion | H04L 9/00 |

OTHER PUBLICATIONS

"Creating Registries and Devices", Retrieved From: https://cloud.google.com/iot/docs/how-tos/devices, Retrieved on: Jun. 29, 2018, 6 Pages.

"How do I create self-signed device certificates to authenticate my devices with AWS IoT?", Retrieved From: https://aws.amazon.com/premiumsupport/knowledge-center/iot-self-signed-certificates/, Retrieved on: Jun. 29, 2018, 13 Pages.

"IOT Device Security and Key Management", Retrieved From: https://www.escrypt.com/en/solutions/iot-device-security, Retrieved on: Jun. 29, 2018, 5 Pages.

"Key injection", Retrieved From: https://hsm.utimaco.com/solutions/applications/key-injection/, Retrieved on: Jun. 29, 2018, 6 Pages.

"Manage keys for content trust", Retrieved From: https://docs.docker.com/engine/security/trust/trust_key_mng/, Retrieved on: Jun. 29, 2018, 3 Pages.

"Using API Keys", Retrieved From: https://web.archive.org/web/20170715154322/https:/cloud.google.com/docs/authentication/api-keys, Jul. 15, 2017, 5 Pages.

Betts, et al., "Control access to IoT Hub", Retrieved From: https://docs.microsoft.com/en-us/azure/iot-hub/iot-hub-devguide-security, Feb. 12, 2018, 18 Pages.

Gremban, et al., "Understand Azure IoT Edge modules", Retrieved From: https://docs.microsoft.com/en-us/azure/iot-edge/iot-edge-modules, Feb. 15, 2018, 5 Pages.

Yura, "Essential Guide to Making Your App Work Offline", Retrieved From: https://www.romexsoft.com/blog/make-app-work-offline/, May 11, 2017, 8 Pages.

* cited by examiner

TRUSTED KEY DIVERSITY ON CLOUD EDGE DEVICES

BACKGROUND

Compute clouds are increasingly used to host software due to their expanding capabilities, cost effectiveness, convenience, performance, and security, among other reasons. Security is an integral part of every compute cloud. A cloud typically provides authentication and authorization for tenant software, workloads, virtual machines (VMs), containers, etc. The increasing use of clouds has created a need to extend their reach to edge devices, so-called Internet of Things (IoT) devices. Edge devices might be appliances, sensor nodes (or motes), meters, control units, and so forth.

Systems of trust are needed to incorporate edge devices into clouds. To interact with a cloud and invoke cloud services, edge devices need to be trusted by the cloud. Such trust is usually embodied in the form of a trusted cloud identity. The trust of the device identity may be rooted in a secret that is shared by the edge device and the cloud that it will participate in. For example, the manufacturer or owner of an edge device might register with the cloud a unique device key securely stored on the edge device. The cloud securely stores the device key, which then serves as the root of trust between the cloud and the edge device. This shared secret key can then be used to sign credentials such as tokens and certificates, which can then serve as a form of cloud identity for the edge device.

While this approach is helpful for securely integrating edge devices into clouds, as only the inventors have observed, device-rooted trust may not be adequate for the cloud functionality that is evolving on edge devices. As only the inventors have appreciated, there may be needs for other trusted identities on an edge device. For instance, if an edge device runs software modules (e.g., workloads or applications) designed to interact with the cloud or exchange data with the cloud, it may be helpful for those software modules to have their own identities that are trusted by the cloud and unique with respect to the cloud.

To elaborate, as observed only by the inventors, IoT or edge devices communicate with a cloud. It has become desirable to deploy cloud workloads to these edge devices. Although it is possible for such cloud workloads or modules to use the trusted identity of the edge device that they execute on, directly using the cloud identity of the edge device is not ideal. The lifetime of the edge device identity may not be suited for possibly ephemeral cloud modules. Furthermore, the cloud privileges authorized by the edge device identity may be inadequate or too extensive for a given cloud module. If different tenants will potentially execute respective workload modules on the same edge device, it would be poor security to have all of those modules share the same cloud identity. If each module were provided with its own unique trusted cloud identity, the scope and duration of such an identity could be fitted to the particular tenant or module.

As observed by the inventors alone, a module-specific identity approach can enable the edge device to function more like an extension of the cloud. Not only can the edge device execute arbitrary cloud modules that the cloud can treat as distinct entities, but module-specific trusted cloud identities can be used on the edge device itself to further aid extension of the cloud to the edge device. For instance, if the edge device has cloud-extension software that allows it to operate as a cloud proxy when offline (e.g., data caching, cloud service emulation, etc.), module-specific trusted cloud identities can be used for local cloud interactions as well interactions with cloud services.

Techniques related to efficient and secure diversification of trusted identities on a cloud edge device are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A root of trust is established between a cloud and an edge device that communicates with the cloud. The root of trust may be embodied as a secret device key securely stored by the edge device and the cloud. The edge device receives arbitrary cloud modules (workloads) that include guest/tenant code that may communicate with the cloud and possibly local/leaf devices connected to or included with the edge device. The edge device extends or diversifies the root of trust to the cloud modules based on the device key. New keys are derived from the device key. The new keys are used to sign credentials (e.g. tokens or certificates) for the respective cloud modules. This provides each cloud module with its own trusted unique cloud identity that can be verified by the cloud using the cloud's copy of the device key.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Figure 1:
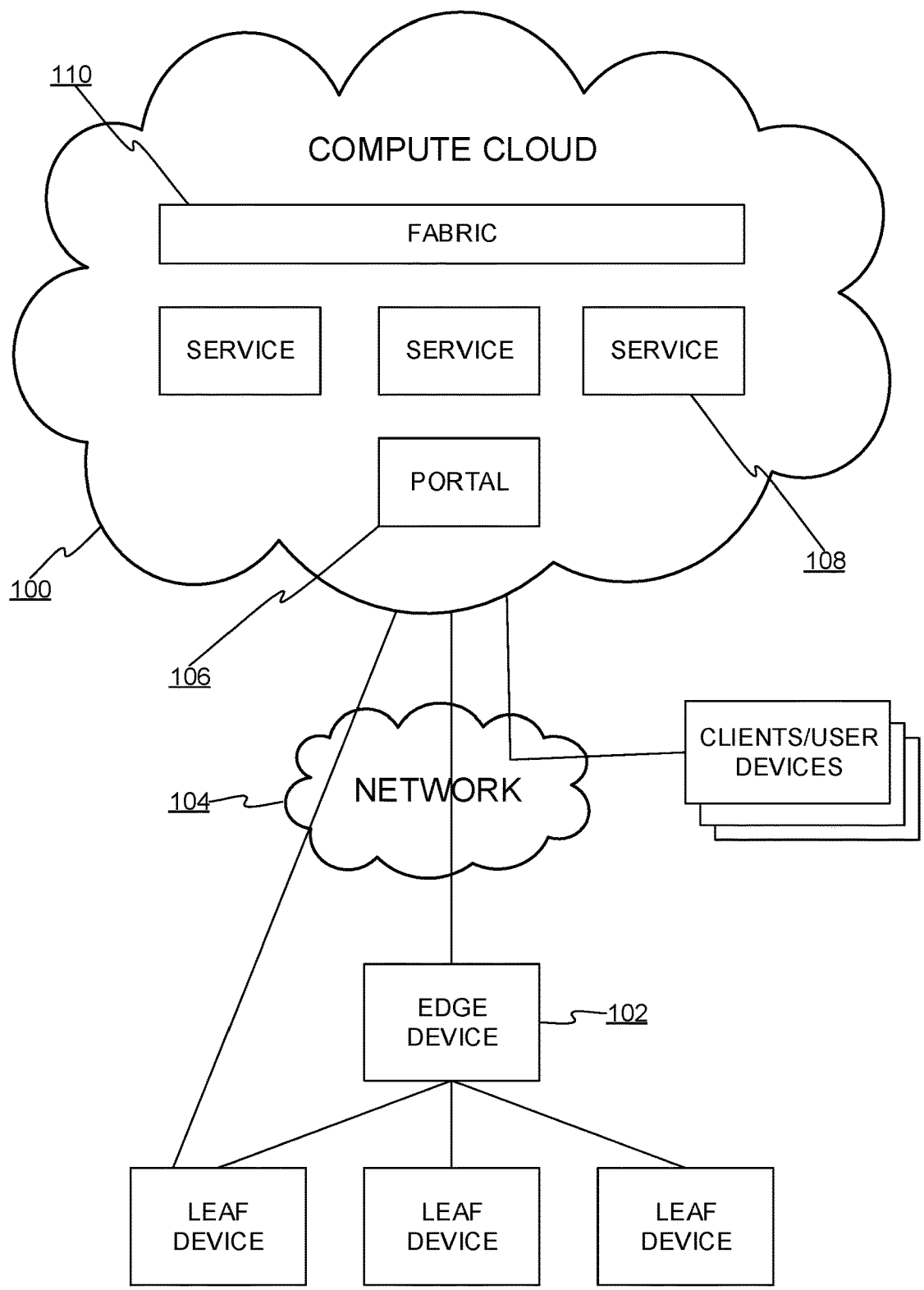
FIG. 1 shows an example of a compute cloud communicating with an edge device.

FIG. 1 shows an example of a compute cloud 100 communicating with an edge device 102 via a network 104. The compute cloud 100 may include a variety of components communicating on an internal network of the cloud 100. To that end, the cloud 100 may implement a variety of architectures, including Infrastructure as a Service (IaaS), Platform as a Service (PaaS), serverless computing, Software as a Service (Saas), or combinations thereof. Examples of common clouds are Microsoft Azure™, Amazon Web Services™, Google Cloud™, to name a few. Regardless of its software architecture and how it is presented to users, the cloud 100 will include a variety of hardware assets such as datacenters with servers, networking devices interconnecting servers (many having virtualization stacks for executing VMs) and datacenters, storage systems, VM management tools, and so forth.

The cloud 100 may include a portal 106 or web/console frontend through which tenants or users of the cloud 100 may be presented with a graphical user interface for reserving or purchasing cloud resources, uploading or configuring workloads to execute on the cloud 100, subscribing to cloud services 108, working with telemetry data, registering and provisioning devices such as the edge device 102, and other known functions. The cloud 100 may include a fabric 110 for managing the cloud, enabling components or services 100 to cooperate, managing and allocating resources, etc. The services 108 may include a database service, an abstract/blob data storage service, machine learning services, search/indexing services, identity management services, IoT services, backup services, networking services, web services, and/or others. Cloud services 108 may have application programming interfaces (APIs) invocable from within the cloud 100 as well as by external devices such as the edge device 102. The APIs may be specific to the particular cloud 100 but implemented with known application-layer protocols such as the hypertext transport protocol (HTTP, perhaps with a RESTful architecture).

Figure 2:
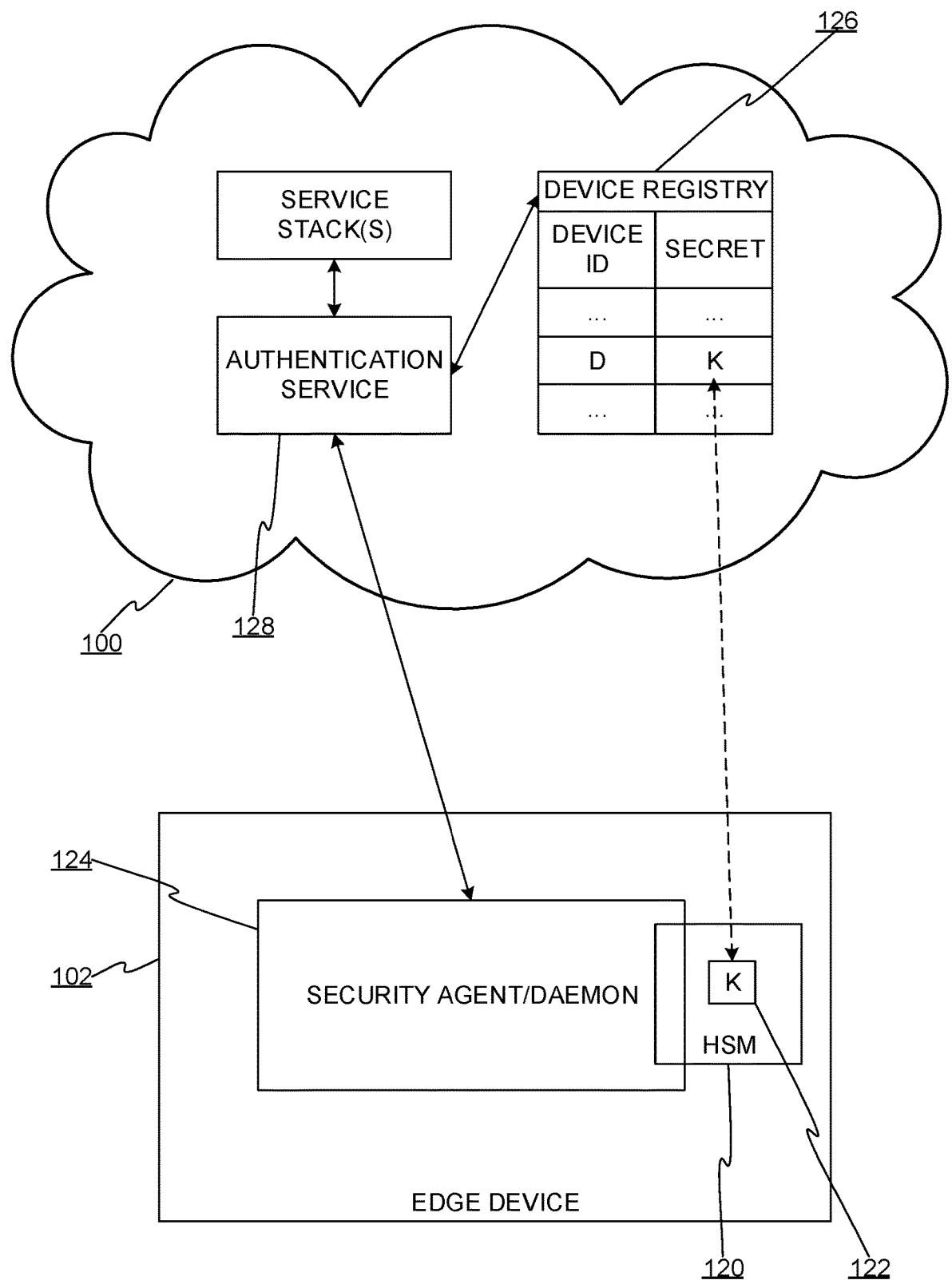
FIG. 2 shows an example of how the edge device and cloud can cooperate to provide the cloud with hardware-rooted trust of the edge device.

FIG. 2 shows an example of how the edge device 102 and cloud 100 can cooperate to provide the cloud with hardware-rooted trust of the edge device 102. The edge device 102 is configured with a hardware security module 120 (HSM). The HSM 120 will include a cryptoprocessor for performing encryption functions (e.g., hashing, generating public keys, decrypting, and encrypting). The HSM 120 may be implemented as a Trusted Platform Module (TPM), embedded Secure Element (eSM), ARM Trustzone, Intel SGX, or a custom secure silicon technology). The HSM 120 will usually also include a secure storage for securely storing key material. In the example of FIG. 2, the HSM 120 securely stores a device key 122 (K), although there may be multiple keys or space for the same. The device key 122 is installed or added by a manufacturer, owner, or other privileged possessor of the device.

The edge device 102 may also include a security agent or daemon 124. The security daemon 124 may help to provide a secure environment on the edge device 124. For instance, the security daemon 124, in cooperation with the HSM 120, may implement secured and measured booting of the edge device, identity provisioning and transition of trust, secure local cloud components or services (for instance a device provisioning service), monitor the integrity of runtime edge operations, act as a gatekeeper to device hardware root-of-trust through notary services, etc. For embodiments described herein, the security daemon 124 may also be involved in securely provisioning cloud modules that execute on the edge device 102 with trusted unique identities. In relation thereto, the security daemon 124 may also access the cryptoprocessor and secure storage of the HSM 120.

The edge device is registered with the cloud 100 to establish, with the cloud, a hardware-based root of trust. When the edge device is registered (and possibly provisioned with cloud related software), the device key 122 is obtained from the HSM 120 and stored in a device registry 124 of the cloud. Although there may be encryptions and signatures involved in the process, what is notable is the capability of the cloud to authenticate using the secret device key 122. The device key 122 may be stored in a device registry 126 that stores other device keys in association with their respective device identifiers, which may be linked to various security information such as identities, access privileges, etc. The key information, authentication, verification, signings, etc., may be performed by a cloud authentication service 128.

Figure 3:
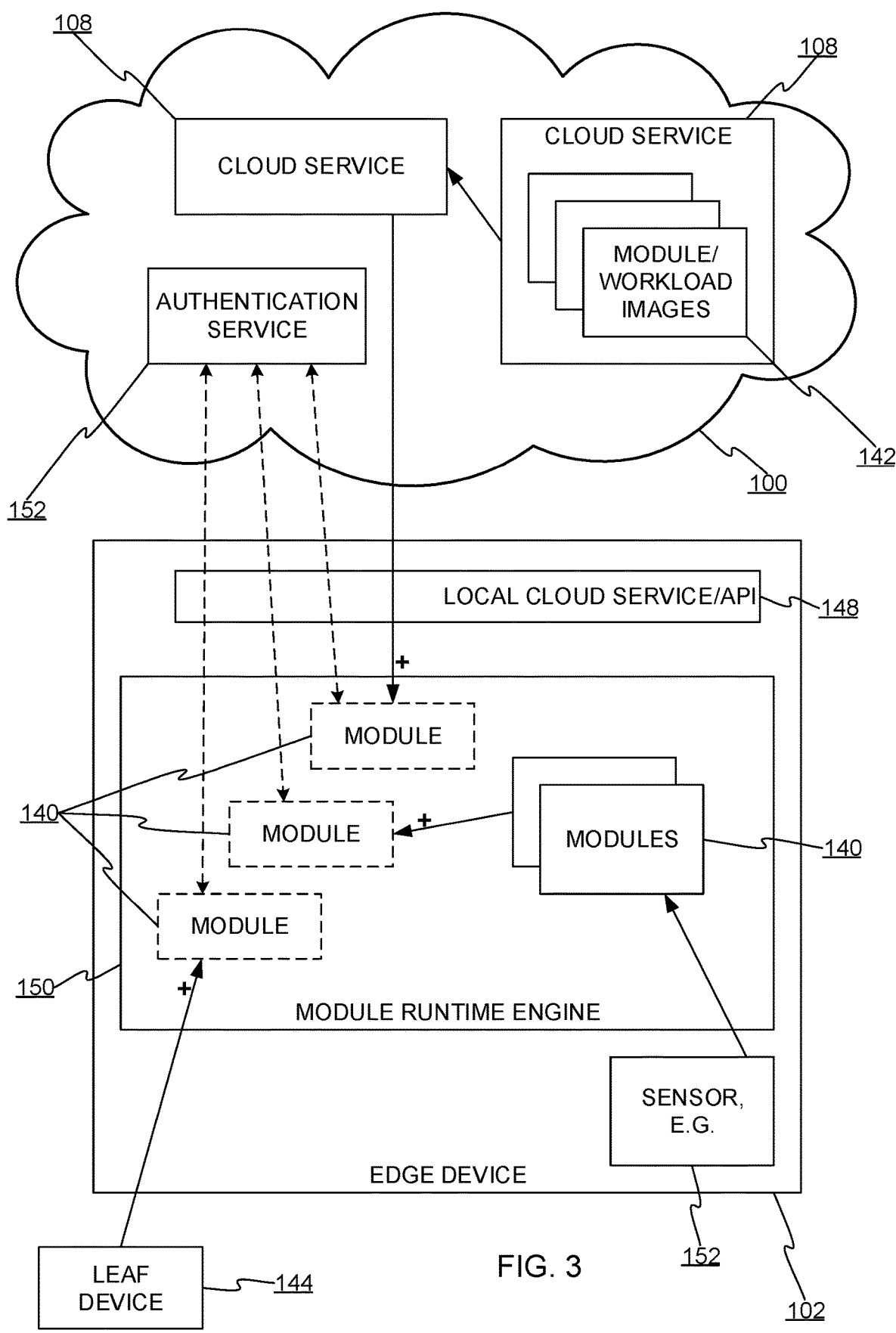
FIG. 3 shows how an edge device may receive and manage arbitrary cloud workload modules.

FIG. 3 shows how an edge device 102 may receive and manage arbitrary cloud workload modules 140. The edge device 102 is configured with a module runtime engine 142 that executes the modules 140. Modules 140 may instantiate or arrive at the edge device 102 from various sources. Some modules 140 may originate from outside the edge device. Modules 140 may arrive from the cloud 100. In one embodiment, a cloud service 108 may store module images 142 which are preconfigured with workload software and possibly standard software components for interfacing with the particular cloud and/or components on the edge device (e.g., the runtime engine 142 or the security daemon 124). When a need for a new module arises, the new module is instantiated from a module image 142 and sent to the edge device. A module may also be generated by another module 140, for instance by a running module duplicating or forking itself. It is also possible for a leaf device 144 to add a new module. There may be a local service 146 with an API 148 that on-boards new modules, for instance cooperating with the security daemon 124 to verify the modules, configuring modules to execute on the particular hardware of the edge device, and so forth.

A module runtime engine 150 manages execution of the modules 140. In one embodiment, the runtime engine 150 provides hardware virtualization to isolate modules and give each module its own virtual execution environment. For instance, the runtime engine 150 may include a hypervisor and the modules may be implemented as VMs. Or, the runtime engine 150 may include a container engine (e.g., a Kubernetes or Docker engine) and the modules are implemented as containers. The container engine may provide modules with varying levels of isolation for network, storage, processor, filesystem, and other resources. In another embodiment, a module may be packaged executable code that can be loaded and executed as processes managed by a kernel of the runtime engine 150. When executing, a module may communicate with the cloud, other modules, local equipment such as a sensor 152, a leaf device 144 that might have a connection with the edge device even when it is offline with respect to the cloud, and so forth.

The runtime engine 150 may have other functions to facilitate module execution. The runtime engine 150 may enable module inter-communication, chaining of modules, collecting telemetry data from modules, maintaining execution of modules (e.g., restarting failed modules), and, as discussed below, providing trusted cloud identities for the modules. When a module is provided with a cloud identity, it may use that cloud identity to authenticate with a cloud authentication service 152 (or a local proxy thereof) and consequently obtain access privileges commensurate with its cloud identity.

Figure 4:
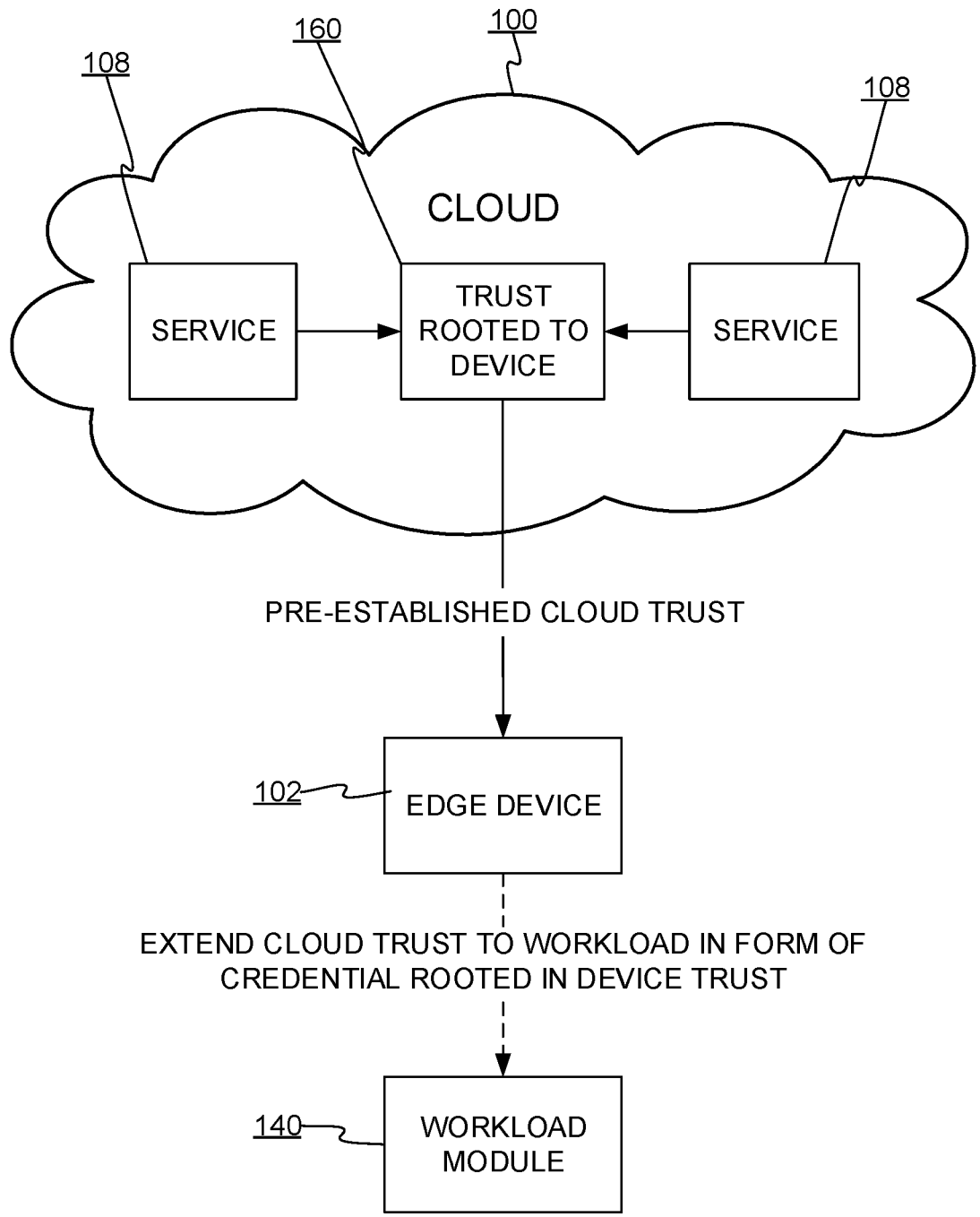
FIG. 4 shows the general idea of extending trust from an edge device to cloud workload modules.

FIG. 4 shows the general idea of extending trust from an edge device 102. As discussed previously, the cloud 100 has a root of trust 160 in the form of a hardware-secured shared secret, e.g., a unique HSM-secured key. The root of trust enables cloud services 108 to make security decisions, for instance, verifications that in turn allow extension of the trust. The edge device 102, when provisioned for or attached to the cloud 100, has components for module security and management as discussed above. At that time or later, trust is established on the edge device via the shared secret device key. With appropriate credentials in place via exchange with the cloud, the edge device 102 can generate new secret keys and corresponding credentials that can be used by respective modules on the edge device to establish individual trusts (or extensions of the root of trust) with services of the cloud.

Figure 5:
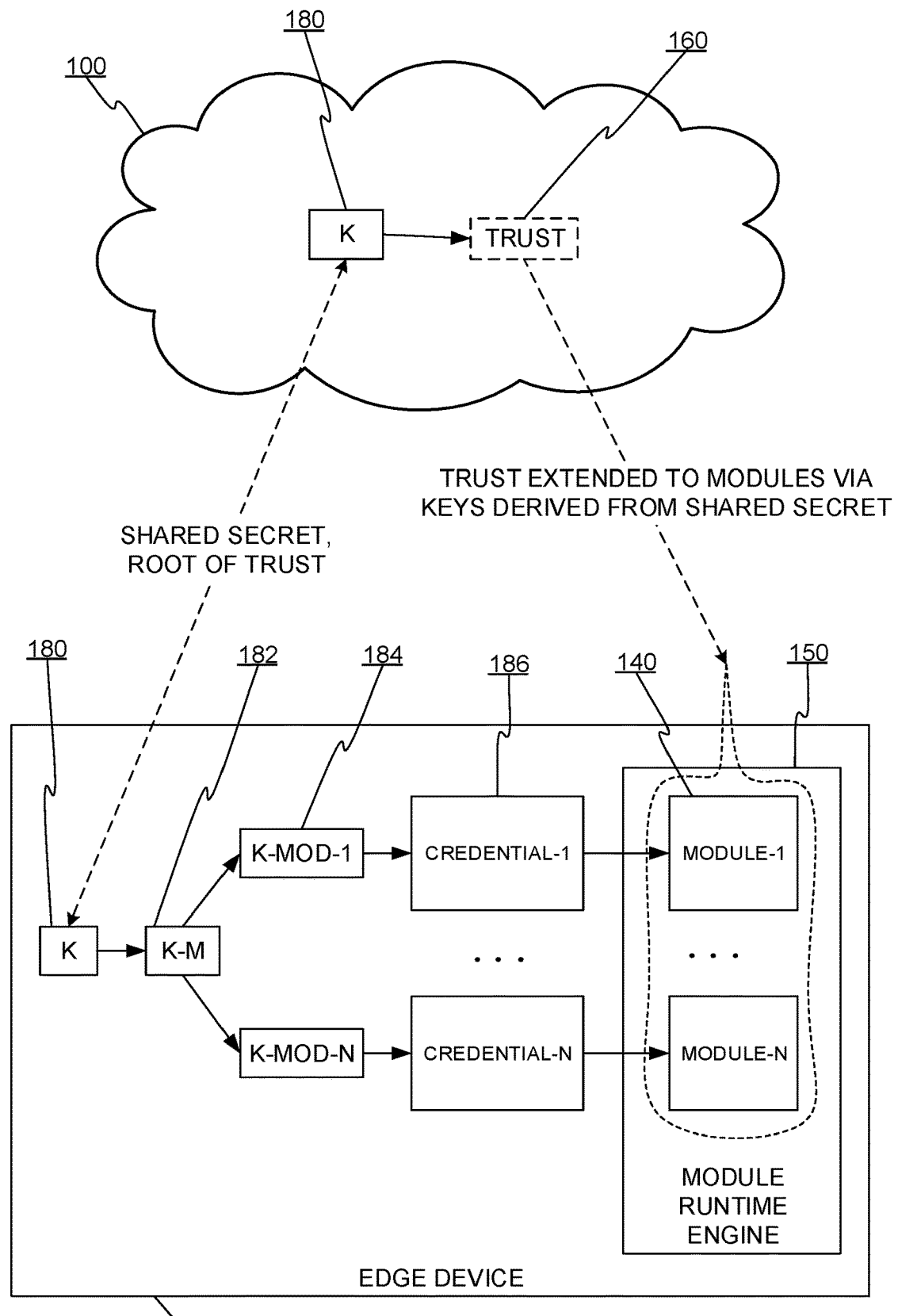
FIG. 5 shows how an edge device's shared secure-hardware-backed secret key can be used to diversify (and extend) the root of trust it possesses to cloud workload modules configured to execute on the edge device.

FIG. 5 shows how an edge device's shared secure-hardware-backed secret key 180, either symmetric or asymmetric, can be used to diversify (and extend) the root of trust it possesses to cloud workload modules configured to execute on the edge device and exchange commands and data with services of the cloud 100. The secret key 180 is stored in the cloud registry and in the edge device's secure hardware, e.g. an HSM, TPM, etc. The shared secret key 180 is used to generate a secret master key 182 (K-M). A corresponding credential (not shown) can be created using the secret key 180, in advance, or when needed, and with or without an exchange of the master key 182.

The master key 182, also perhaps stored in the edge device's secure hardware via the security daemon 124 (or possibly stored in shielded memory of the security daemon 124), can be used to generate new module keys 184 that can secure module credentials 186 for respective modules 140. Moreover, the module credentials 186 can become (or be linked to) cloud identities used for security purposes by the modules when interacting with the services of the cloud, the cloud infrastructure on the edge device (e.g., the local service 148, the runtime engine 150, the security daemon 124), leaf devices 144, or with other modules.

Figure 6:
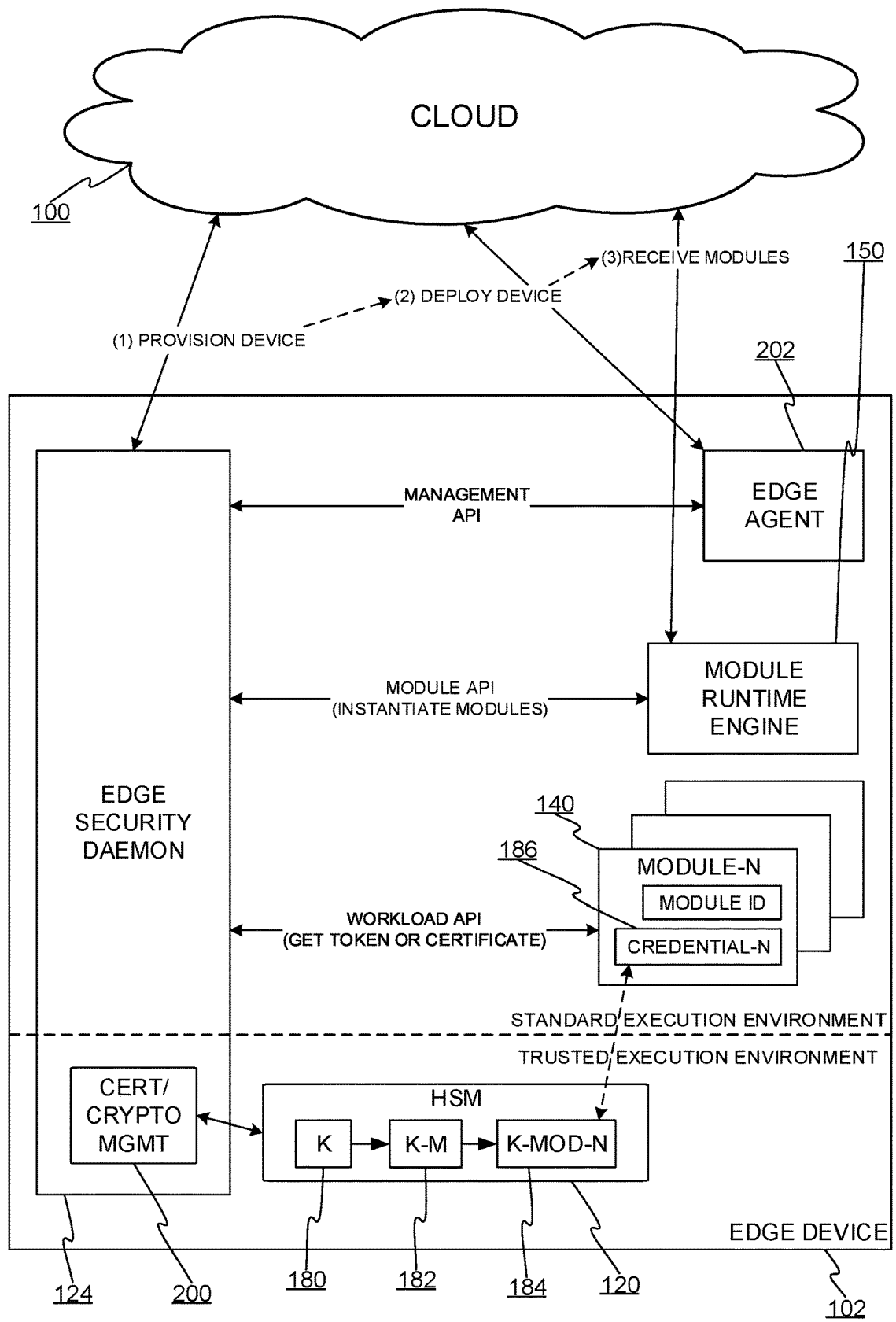
FIG. 6 shows an overview of how the key diversification scheme shown in FIG. 5 may be implemented on the edge device.

FIG. 6 shows an overview of how the key diversification scheme shown in FIG. 5 may be implemented on the edge device 102. The HSM 120 stores the root of trust shared secret such as the shared key 122. The HSM 120 also performs cryptographic functions such as encryption and decryption, random number generation, hashing, generating and verifying signatures, and other known functions. A security component 200 of the security daemon 200 interfaces with the HSM 120 to invoke functions of the HSM 120 for generating the module-specific keys and credentials. The security daemon 124 may also provide an API for workload modules 140 to obtain credentials. As discussed above, the module runtime engine 150 manages execution of the modules and helps them obtain cloud identities or credentials through another API.

Sequentially, the components of FIG. 6 involve a cycle of (1) provisioning the edge device 102 for collaborating with the cloud, including installing software components shown in FIG. 6, perhaps measuring or signing the components, and establishing the shared secret root of trust with the cloud; (2) deploying the device, such as an edge agent 202 generating a device-specific credential (cloud identity) using the shared secret key (e.g., a certificate for the components executing on the edge device), and (3) receiving modules by the module runtime engine 150, the modules (and optionally cloud services) cooperating to generate cloud-trusted module-specific identities or credentials. Note that not all embodiments will necessarily use the master key 182 (K-M).

Figure 7:
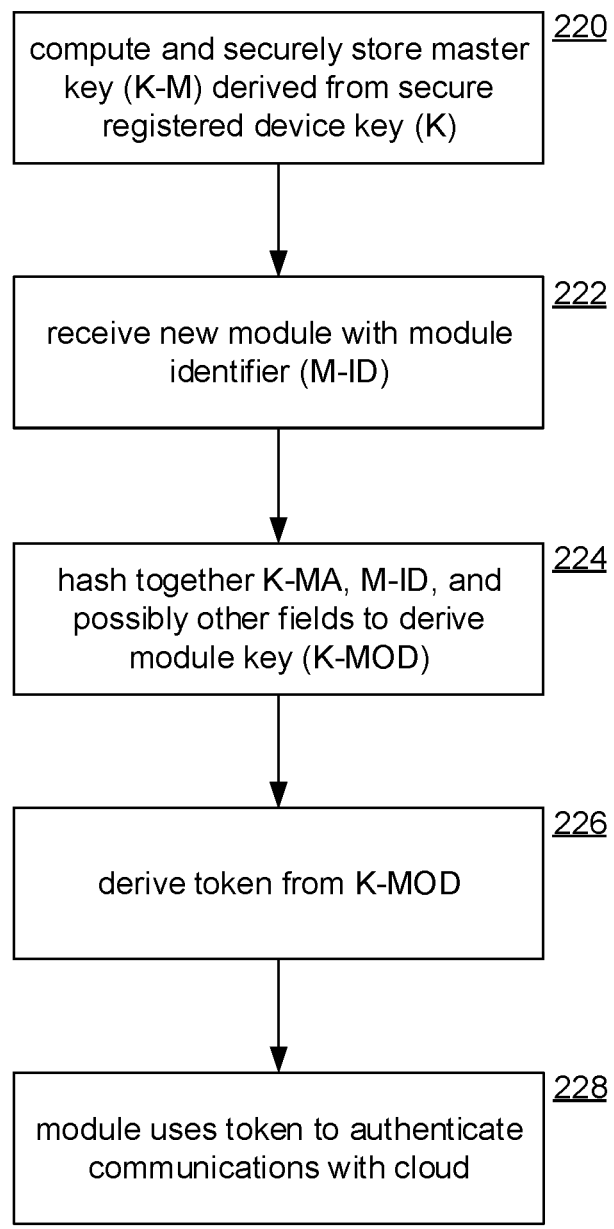
FIG. 7 shows a key diversification process that uses a symmetric key scheme.

FIG. 7 shows a key diversification process that uses a symmetric key scheme. The process of FIG. 7 assumes that the relevant edge device has been provisioned for cloud integration, a shared root of trust has been established, and the edge device is generally configured to receive and execute workload modules 140. At step 220 an intermediate key such as master key 182 (K-M) is generated from the share secret key 180 using known techniques (e.g., encrypting a random number with the symmetric master key 182). Step 220 may be performed when the edge device is provisioned or later, on demand, when a module cloud identity is first needed.

At step 222 a new module 140 instance is received by the edge device. The edge device determines (or assumes because the module is new) that the new module 140 is untrusted and therefore initiates extension of the root of trust to the new module. The new module 140 includes a module ID (M-ID) that is available for that trust extension. The module ID may be a name or label, possibly partly determined by a user or tenant who commissioned or authored the module (possibly derived from an identifier of a corresponding module image), and perhaps uniquified by the cloud appending a random number or the like. Regardless of its genesis, the cloud-unique module ID is not secure and cannot serve as a basis of trust for the cloud or the edge device because one with access to the edge device can potentially modify a module ID.

At step 224 a module-specific key (K-MOD) is computed as a function of the module ID (M-ID), the master key (K-M), and possibly other fields. Specifically, K-MOD may be computed using a cryptographic hash function such as HMAC-SHA-1, HMAC-SHA256, HMAC-SHA3, or other known functions (referred to collectively as "HMAC" hereafter). In other words, K-MOD=HMAC (K-M, M-ID, [optional fields]), where an optional field might be a nonce, a timestamp or expiration time, etc. At step 226 K-MOD is used to sign a security token (credential) that is specific to the new module. The security token is then provided to the new module which uses the token when communicating with local or remote cloud components. In one embodiment, the module-specific secret key K-MOD is not directly exposed to the new module, rather K-MOD is securely stored in the HSM while needed and the security daemon intermediates an exchange between the new module and a cloud service to generate and acquire the token. Or, the security daemon itself may generate the token (or obtain it from the cloud) and uses K-MOD to sign the token which it then passes to the new module. Alternatively, although less secure, the new module may acquire K-MOD from the security daemon and use it to sign the token.

At step 228 the token is presented by the new module to establish trust when communicating with a cloud service (e.g., via a corresponding API or application-layer protocol), cloud components on the edge device (e.g. components for offline cloud emulation), other modules on the edge device, when communicating with leaf devices, and so forth. A recipient of the token can request the cloud's authentication service 128 to verify the token using the stored device key 122 in the registry 126. The edge device itself can also verify the token, for instance for local components when in an offline mode.

The token may have any of a variety of security-related fields (all secured via the signature of the token) Preferably the token has an expiration/duration built into it so that does not live much longer than its module. If the token expires while the module continues to execute the module can request a new token through the same process.

In one embodiment, the K-MOD key is sent to the cloud during creation of a corresponding token. In another embodiment this exchange can be avoided. Because the cloud has all of the information that the edge device has and because the cryptographic hash function is deterministic (there is a one-to-one mapping between inputs and outputs), the cloud can reproduce the K-MOD key at its end when needed. It should be noted that module keys may not need to be stored long-term, but rather can be computed, used to sign a token, and then discarded. In another embodiment the master key K-M is shared and then available to do derivation for all the module keys. Yet another approach is to use a lazy creation. When the token is received for the first time at the cloud a cloud service creates the new cloud identity at the cloud, which can facilitate cloud identity/credential creation by the edge device while the edge device is offline with respect to the cloud.

Figure 8:
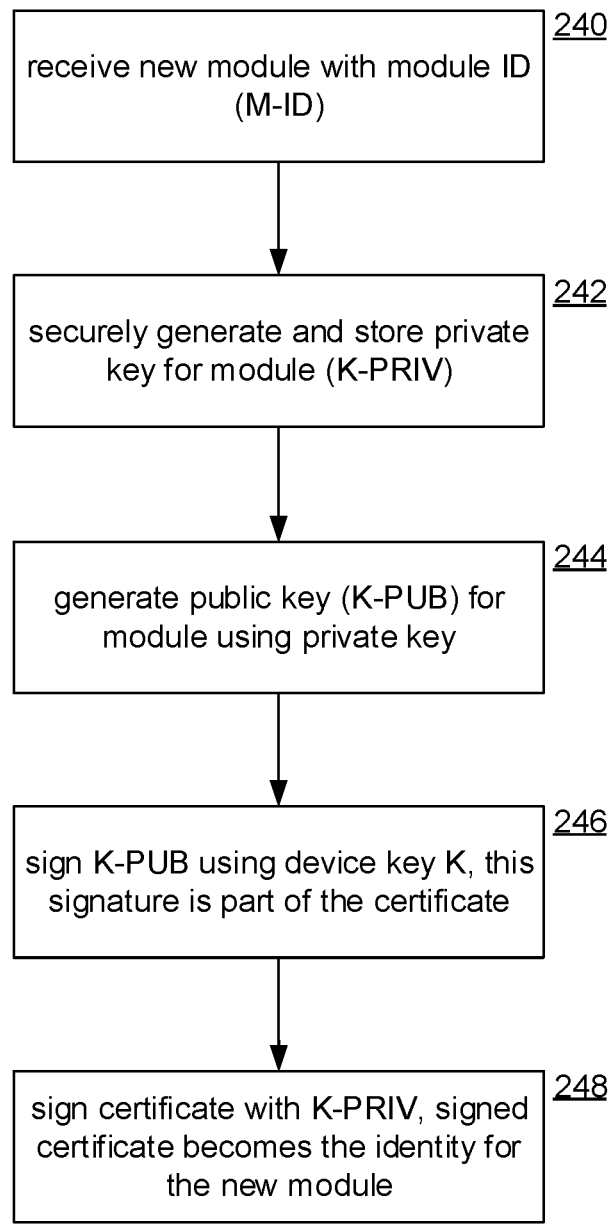
FIG. 8 shows a key diversification process that uses a public or asymmetric key scheme.

FIG. 8 shows a key diversification process that uses a public or asymmetric key scheme. As with the symmetric key case discussed above, the process of FIG. 8 assumes that the relevant edge device has been provisioned for cloud integration, a shared root of trust has been established, and the edge device is generally configured to receive and execute workload modules 140.

At step 240 a new module with a corresponding module ID (discussed above) is received or spawned by the edge device. At step 242, either beforehand or when the new module is received, a private key (K-PRIV) is computed from the master key or any key chained to the shared secret device key K. For example, an elliptic-curve cryptography (ECC) function can be used to create the private key K-PRIV and K-PRIV is then used to compute the public key K-PUB at step 244. Specifically, the HSM computes a random number that the ECC maps to K-PRIV. At step 246 the K-PUB key is signed using the device key K or a key chained to it such as master key K-M. At step 248 the signature is used as part of a new certificate that is acquired in similar fashion to any of the token acquiring variations discussed above with reference to FIG. 7. The certificate is signed with the module-specific private key K-PRIV. The public key K-PUB can then be verified by a cloud service or any other component in possession of the key K (or K-M) used to sign the K-PUB key. The public key can also be used by the cloud (or other components) to verify the signature of the new module's cloud certificate. Note that because a signature is being exchanged it is preferable to do so using an encrypted channel such as a Transport Layer Security (TLS) connection. If the X.509 protocol is implemented, the device key or a key derived therefrom may be used to secure the TLS connection.

Although the mechanics of the public key embodiment differ from that of the symmetric key embodiment, both embodiments involve using a shared root of trust to enable an edge device, perhaps even while not able to communicate with the cloud, to provide diverse trusted credentials to arbitrary cloud workload modules executing on the edge device. Both embodiments also use keys chained from a shared device key to verify credentials/identities for arbitrary modules (modules with any user code). Furthermore, while embodiments above use an HSM, software equivalents (e.g., a "soft" or emulated HSM) may be used instead, albeit with possibly weaker security.

One advantage of the key diversification techniques described above is that the edge device has its own device-specific cloud identity that is distinct from the module identities, and the device and module identities (credentials) can all be used with the same cloud security mechanism. Moreover, the cloud identities/credentials on the same edge device can be assigned to different entities (tenants/users) that subscribe to the cloud. That is, different entities can be individually trusted by the cloud on the same edge device. Not only does this generally improve security, but it also improves security by allowing permissions granted (as configured in credentials) to be suited to the needs of the modules, which on the whole minimizes the extent of privileges that need to be granted.

Figure 9:
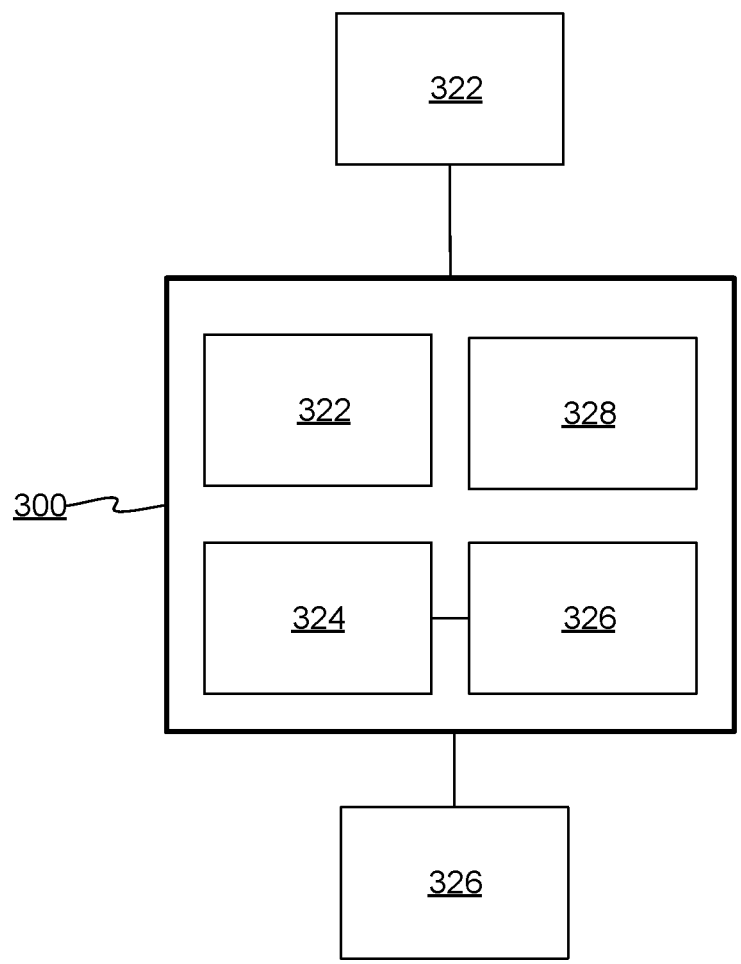
FIG. 9 shows details of a computing device on which embodiments described herein may be implemented.

FIG. 9 shows details of a computing device 300 on which embodiments described above may be implemented. Cloud servers, edge devices, leaf devices, and other devices discussed or implied above may more or less mirror the computing device 300. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 300 (possibly via cloud APIs) to implement the embodiments described herein.

The computing device or host 300 may have one or more displays 322, a network interface 324 (or several), as well as storage hardware 326 and processing hardware 328, which may be a combination of any one or more of: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device or host 300 may cooperate in ways well understood in the art of machine computing. In addition, input devices may be integrated with or in communication with the computing device or host 300. The computing device or host 300 may have any form-factor or may be used in any type of encompassing device. The computing device or host 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by an edge computing device, the method comprising:

executing a container engine by the edge computing device, the edge computing device comprising processing hardware, storage hardware, and a hardware security module (HSM), the HSM comprising a cryptoprocessor and an encrypted storage, the container engine configured to execute arbitrary containers by virtualizing access to the storage hardware and computing hardware;

receiving a container from a cloud service, the container having an associated container identifier, the container comprising guest software;

based on receiving the container, computing a container key for the container, wherein the container key is rooted to a device key of the edge computing device;

computing a credential for the container based on the container key, wherein the credential is specific to the container and unique with respect to the cloud; and executing the container and the guest software therein, the guest software, when executing, communicating with the cloud service, the communicating including transmitting the credential to the cloud service, wherein the cloud service authorizes the guest software by validating the credential.

2. A method according to claim 1, wherein the credential is signed by the container key and the signed credential includes indicia of an authorization level, account level, and/or an authorization to use an identified cloud service or cloud resource.

3. A method according to claim 1, wherein the device key is provisioned to the HSM during production of the HSM.

4. A method according to claim 1, further comprising computing the container key at the cloud without receiving the container key from the edge device.

5. A method according to claim 4, further comprising computing the container key at the cloud when the credential is first evaluated by the cloud.

6. A method according to claim 1, wherein the edge device computes different container keys for different respective modules loaded to the edge device for execution thereby, and wherein the container keys are used to compute credentials for the modules that are each rooted to the device key.

7. A method according to claim 6, wherein the edge device has a device credential rooted to the device key that the edge device uses to authenticate with the cloud, and wherein the device credential and corresponds to one cloud subscriber/user and the credentials for the modules correspond to one or more other cloud subscribers/users.

8. A method according to claim 1, further comprising computing the container key by hashing an identifier of the container with the device key or a key derived therefrom.

9. A system comprising:
an edge computing device configured to:
execute arbitrary containers by virtualizing access to storage hardware and computing hardware;
receive a container from a cloud service, the container having an associated container identifier, the container comprising guest software;
based on receiving the container, compute a container key for the container, wherein the container key is rooted to a device key of the edge computing device;
compute a credential for the container based on the container key, wherein the credential is specific to the container and unique with respect to the cloud; and
execute the container and the guest software therein, the guest software, when executing, communicating with the cloud service, the communicating including transmitting the credential to the cloud service, wherein the cloud service authorizes the guest software by validating the credential.

10. The system of claim 9, wherein the credential is signed by the container key and the signed credential includes indicia of an authorization level, account level, and/or an authorization to use an identified cloud service or cloud resource.

11. The system of claim 9, wherein the edge device includes a hardware security module (HSM) and the device key is provisioned to the HSM during production of the HSM.

12. The system of claim 9, wherein the cloud service authorizes the guest software by validating the credential without receiving the container key from the edge device.

13. The system of claim 9, wherein the edge device is further configured to compute different container keys for different respective modules, and wherein the container keys are used to compute credentials for the modules that are each rooted to the device key.

14. The system of claim 13, wherein the edge device has a device credential rooted to the device key that the edge device uses to authenticate with the cloud, and wherein the device credential and corresponds to one cloud subscriber/user and the credentials for the modules correspond to one or more other cloud subscribers/users.

15. The system of claim 9, further comprising computing the container key by hashing an identifier of the container with the device key or a key derived therefrom.

* * * * *